United States Patent Office 3,178,105
Patented Apr. 13, 1965

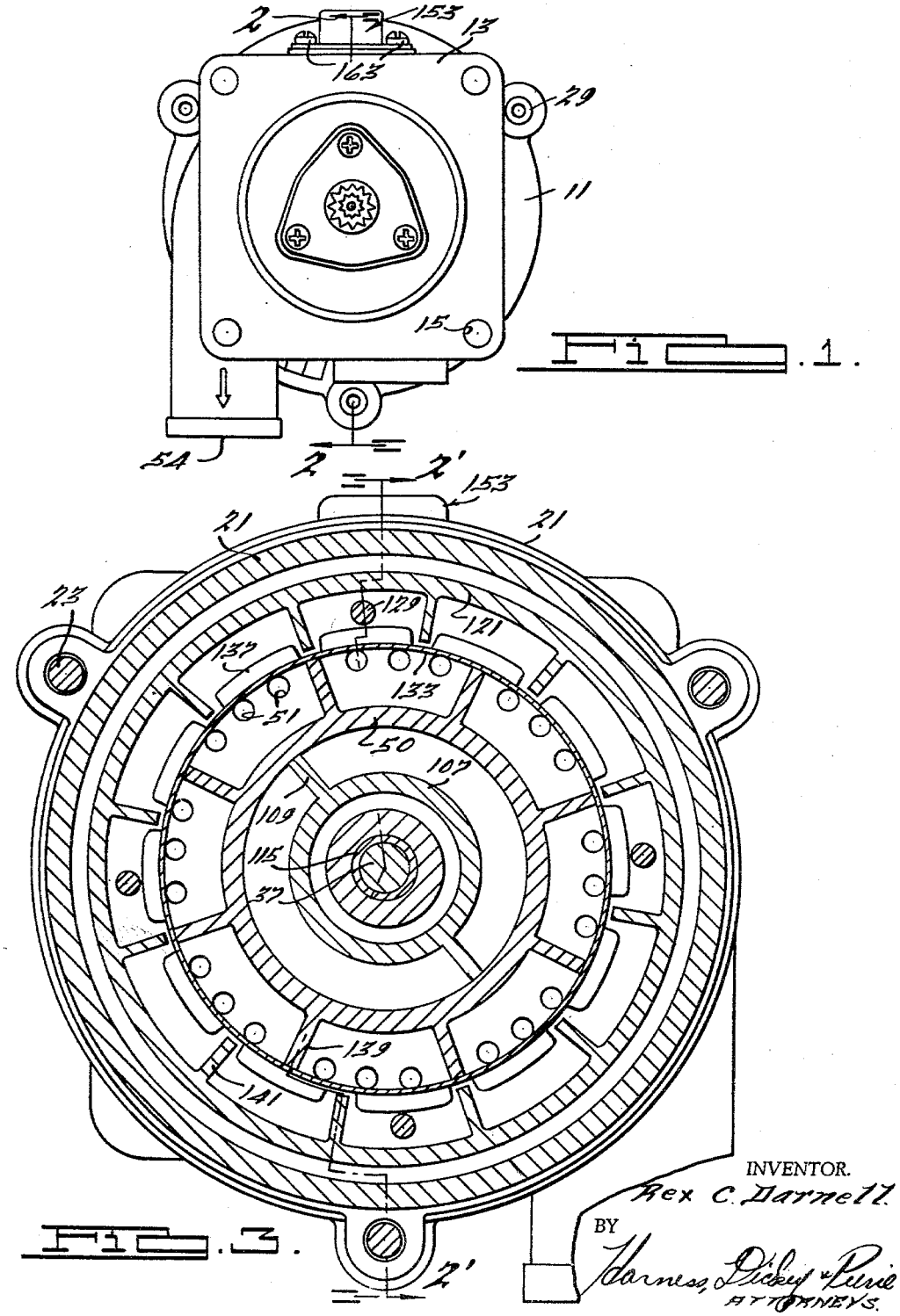

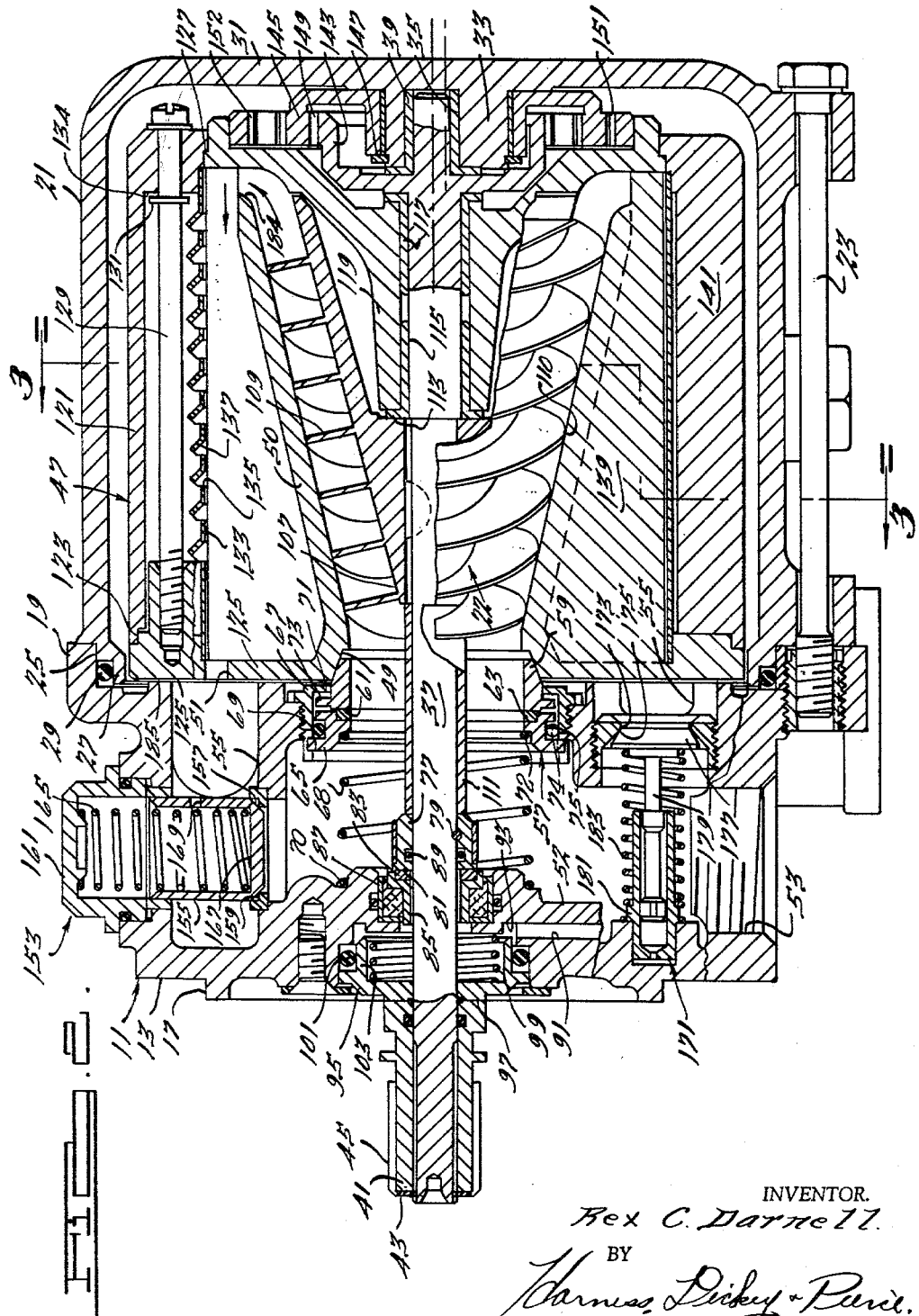

3,178,105
CONTAMINANT EXTRACTING BOOST PUMP
Rex C. Darnell, Dexter, Mich., assignor, by mesne assignments, to Michigan-Dynamics, Inc., Detroit, Mich., a corporation of Michigan
Continuation of application Ser. No. 724,716, Mar. 28, 1958. This application May 28, 1962, Ser. No. 203,428
9 Claims. (Cl. 233—7)

This invention relates to a compact liquid delivery device which includes a liquid pump and a contaminant entracting centrifuge, both of which are arranged compactly within a single housing and adapted to be driven by a common source of power.

In the delivery of liquids from reservoir tanks and other sources, it is frequently necessary that the liquid be cleaned of any dirt and other foreign contaminating matter present therein. For example, in the machine tool industry, particularly in hydraulic systems, it is essential that contaminants be removed from the fluid as a guard against orifice plugging, sticking valves and excessive pump wear. Also in aircraft fuel systems, dirt, lint, rust, globular ice particles, and other foreign matter found in the fuel must be removed for the protection of high pressure fuel pumps, sensitive controls, and atomizing nozzles through which the fuel is passed from the fuel tank. A standard approach to the problem of cleansing contaminated liquid has been the use of retention-type line filters in which the contaminant is strained from the liquid. However, retention-type filters suffer from a number of disadvantages, the primary of which is that they cause a reduction in fuel line pressure, which can result in vapor lock or cavitation of high pressure fuel pumps located downstream from the filter.

In my copending application, Serial No. 724,717, filed March 28, 1958, entitled "Centrifugal Contaminant Extractor," now U.S. Patent No. 3,050,240 granted August 21, 1962, I have disclosed a device for extracting a high percentage of the contaminating foreign bodies from flowing liquid, which is particularly adapted for aircraft fuel usage and which gives a boost in fuel line pressure rather than a drop in pressure. The contaiminant extracting device illustrated in my copending application, when used in an aircraft fuel system, would ordinarily be used in addition to an engine driven boost pump located upstream of a high pressure fuel pump. The device of the present invention combines the function of an engine driven boost pump with a centrifuge-type contaminant extractor in a single compact housing in which both components of the device are driven by a common drive shaft. While the device of the present invention may be used in any system in which it is desired to purge a liquid of contaminating particles contained therein and also deliver the liquid to a given source under pressure, the embodiment of the invention illustrated is exemplarily shown in a form adapted for use in an aircraft fuel system and adapted to be driven by the aircraft engine for purposes of cleansing the fuel of contaminants and delivering it under considerably boosted pressure to the high pressure fuel pump.

The device of the present invention includes a pump impeller of the mixed-flow category arranged to discharge fluid directly into a coaxially positioned annular, independently rotatable centrifuge. In the embodiment illustrated the centrifuge surrounds the impeller and provides a duct or housing for the impeller. The device is adapted for interposition in a liquid delivery system and performs the dual function of boosting the pressure of the liquid and cleaning the flowing liquid of contaminants. By the novel design, combination and arrangement of the parts in the device of the present invention, numerous advantages are achieved over any of the separate components heretofore utilized to accomplish the same purposes.

It is, therefore, an object of the present invention to provide a device capable of cleaning contaminated flowing liquid of a high degree of contaminants contained therein and operable to impart a pressure boost to the liquid in a positive and efficient manner.

It is another object of the present invention to provide a device of the above character adaptable for use in aircraft fuel systems which is operable to supply a high pressure fuel pump with an adequate supply of clean fuel at varying altitudes, temperatures and aircraft attitudes.

It is an additional object of the present invention to provide a device capable of fulfilling the above objects which occupies a minimum of space and possesses a minimum of weight compared to the separate devices heretofore utilized to accomplish these purposes.

It is another object of the present invention to provide a device of the above character in which the boundary layer effect created by the relative movement of the impeller blades and the impeller housing adjacent thereto is reduced and the tendency of the pumped liquid to bubble or froth is diminished.

It is another object of the present invention to provide a device of the above character in which the tendency of the impeller to produce bubbles and cause concentrations of vapor in highly volatile liquids is reduced through a more gradual acceleration in angular velocity of liquid entering the impeller.

It is another object of the present invention to provide a device incorporating a mixed-flow impeller and a centrifuge in which the impeller is arranged to discharge liquid directly into a coaxially disposed centrifuge channel so that liquid flowing into the impeller from a fluid conduit is transferred into an annular passage of the centrifuge in a smooth gradual manner, the tendency of the fuel to undergo cavitation is minimized, and the centrifugal force imparted to the liquid by the impeller is utilized to assist in the separation of contaminant by the centrifuge.

It is still another object of the present invention to provide a device of the above character which is capable of efficient operation over a long period of time without requiring maintenance.

It is another object of the present invention to provide a device of the above character having improved valve means for relieving excessive pressures produced by the device and for bypassing the impeller and centrifuge in the event of their failure to function.

It is still another object of the present invention to provide a device of the above character which may be constructed at a lower cost than the separate devices heretofore utilized to accomplish the same purposes.

Other objects and features of novelty of this invention will become apparent from the following detailed description, taken in conjunction with the accompanying drawings wherein:

FIGURE 1 is an end elevational view of a device embodying the principles of the present invention;

FIG. 2 is a sectional view of the structure illustrated in FIG. 1 taken substantially along the line 2—2 thereof, with the rotatable centrifuge portion taken along the line 2'—2' of FIG. 3; and FIG. 3 is a sectional view of the structure illustrated in FIG. 2 taken along the line 3—3 thereof.

Referring now to the drawings, the liquid delivery device of this invention is illustrated as including a cast metal housing 11 having an integral mounting flange 13 provided with four screw holes 15 for mounting the device on an aircraft engine or other source of power. The flange 13 is additionally provided with a centralizing pilot shoulder 17 by means of which the device may be accurately aligned. The housing 11, which is provided with internal inlet and outlet passages to be hereinafter described, has an outwardly extending annular flange 19 on the right-hand side thereof as viewed in FIG. 2. A generally cup-shaped housing covering member 21 is held against the flange 19 by three screws 23 in order to provide a sealed enclosure for the impeller and centrifuge units to be hereinafter described. An annular shoulder 25, formed on the extremity of the cover member 21, sealingly registers against the inner surface of the flange 19 and is additionally provided with an annular lip 27 holding an O-ring 29 against the flange 19 and in order to provide a leakproof seal between said members.

A circular end wall 31 of the housing cover 21 is provided with an inwardly extending boss 33 having a blind bore 35 facing inwardly of the housing cover 21. A drive shaft 37 is supported at its one end in the bore 35 through the medium of a collared sleeve bearing 39. The opposite end of the drive shaft 37 has an adapter 41 keyed thereto which is held on the drive shaft 37 by means of a lock ring 43. The adapter 41 is exteriorly splined, as at 45, for driving engagement with a complementary splined driving member (not shown) on an aircraft engine or other suitable power source. The drive shaft 37 is supported at this end by its engagement with such driving member.

Rotatably supported on the drive shaft 37 within the housing cover 21 are a pump impeller 22 and centrifuge assembly 47 adapted to be driven independently of one another by the drive shaft 37. The centrifuge assembly 47 annularly surrounds the impeller 22 and is provided with an inner frusto-conically shaped wall 50 which serves as a housing for the impeller. Incoming liquid is admitted to the impeller through a tapered opening 49 at one end of the impeller housing 50, and is thereafter pumped in a generally axial direction to the right-hand end of the impeller 22 as viewed in FIG. 2. The liquid then enters the centrifuge assembly 47 where it reverses its direction and flows in the opposite axial direction. After being purged of contaminating particles contained therein, the liquid emerges from the centrifuge through a plurality of annularly arranged outlet ports 51.

In order to convey liquid to the outlet opening 51, the housing 11 is internally hollowed to form an inlet passage 52 which is threaded at 53 for reception of a suitable coupling. An outlet passage 55 of annular cross section is also formed in the housing 11 so as to face the outlet ports 51 of the rotatable assembly 47, collect the cleansed liquid under pressure and finally deliver it out of the device through an outlet port 54. In order to accommodate the inlet passage 52, the outlet passage 55 is of a shallow depth at the location shown at the bottom of FIG. 2, yet spirals to a greater depth as indicated in the upper portion of FIG. 2.

In order to prevent fluid leakage between the stationary housing 11 and the assembly 47, the housing 11 is provided with a seal assembly 57 including a tapered annular seal member 59 adapted to snugly engage the tapered inlet opening 49 and to be frictionally driven by rotation of the centrifuge assembly 47. The seal 59 is provided with a lapped flat face 61 sealingly engaging an annular carbon seal member 63 held by an annular seal holder 65. An annular seal housing member 67 is threaded into the housing 11 at 69 and is provided with a radially inwardly extending flange 71 disposed axially opposite a flange 73 extending radially outwardly from the seal 59. The flange 71 serves a purpose in retaining the seals 59 and 63 in sealing engagement upon disassembly of the device, which will be hereinafter described. Pressing the seal 63 against the seal 59 is a coil spring 68 which rests in a seat 70 and engages a shoulder 72 formed in the seal holder 65. An O-ring 74 is positioned in a groove 75 formed peripherally around the seal holder 65 so that the O-ring 74 engages the seal housing 67. The carbon seal 63 is stationary as is its holder 65 while the seal 59 rotates with the rotating assembly 47 thereby forming an effective seal between the rotating assembly 47 and housing 11.

In order to prevent fluid leakage between the housing 11 and shaft 37 a face seal member 77 is secured to the shaft 37 by a pin 79 for rotation therewith and is provided with a lapped flat face 81 rotatably engaging a static carbon seal 83 secured in position by a sleeve 85 which is in turn positioned by a seal housing 87 in press fit relationship with the housing 11. As a further guard against leakage a rubber O-ring 89 is positioned between the seal 77 and the drive shaft 37 to prevent leakage therepast. In the event of leakage past the seal 83, a drain passage 91 is provided in the housing 11 which leads to the exterior of the entire device. The inner end of the passage 91 communicates with a cavity 93 formed in the housing 11 which is closed by an outer shaft seal member 95 which maintains face sealing engagement with the adapter 41 at its face 97. Urging the seal 95 into engagement with the adapter 41 is a coil spring 99 disposed within the cavity 93. Further seal provision is made by a rubber O-ring 101 held against the wall of the cavity 93 by flange portion 103 provided on the seal 95.

As liquid enters the housing inlet passage 52 it is directed through the impeller housing inlet opening 49 where it passes into an annular outwardly diverging channel defined on its outside by the impeller housing 50 and on its inside by frusto-conical impeller base 107. The cone base 107 has a double-thread screw-type blade 109 integrally formed thereon and disposed normally to the base 107. The tip 110 of the blade is disposed in closely spaced relationship with the impeller housing 50. Thus the impeller housing 50 confines the liquid being pumped and a marked boost in pressure of the liquid is achieved. The impeller base 107 is in keyed relationship with the drive shaft 37 and is held in correct assembled position between a sleeve 111 and a thrust collar 113 formed on a sleeve bearing 115.

The sleeve bearing 115, together with a second collared sleeve bearing 117 mounted on the drive shaft 37 serve to rotatably support a centrifuge hub 119 which constitutes the entire support for the centrifuge assembly 47. The outer diameter of the centrifuge assembly 47 is defined by a circular cylindrical body member 121 which engages a circumferential annular shoulder 123 formed on an annular end wall 125 integrally formed with the pump impeller housing 50. The opposite end of the body member 121 registers against a shoulder 127 formed on the periphery of the hub 119. Securing the body member 121 in assembled relationship with the hub 119, end wall 125 and its integral impeller housing 50 are a plurality of spaced screws 129. The screws 129 are provided with lock rings 131 in closely spaced relationship to a shoulder 134 formed on the body member 121 for the purpose of pushing apart the several components of the centrifuge assembly 47 as the screws 129 are unscrewed.

It will be noted that the body member 121 and the pump impeller housing 50 form a channel therebetween which is annular in cross section and constantly increasing in area from right to left as viewed in FIG. 2. Dividing this channel is an annular louvered sleeve 133 having a plurality of openings 135 formed therein. The openings 135 are formed by making cuts in the sleeve 133 and bending up the sections of metal adjacent thereto so as to form a louver 137 which annularly overlies the opening 135. The purpose of the louvers 137 is to admit contaminating particles radially outwardly of the sleeve 133 yet retard their re-entry to the annular liquid channel after rotation of the device has been stopped. During rotation of the device liquid flowing through the annular channel outwardly of the impeller housing unit 50 is subjected to an extreme centrifugal force by means of a plurality of vanes 139 which are integrally formed on the impeller housing 50 and extend radially outwardly therefrom in an axial direction. The vanes 139 extend axially from the end wall 125. Under the influence of this centrifugal force contaminating particles of dirt, rust, lint, globular ice, or other foreign matter contained in the liquid are thrown radially outwardly through the louvered openings 135 of the sleeve 133 and impinge against the annular body member 121. The area between the louvered sleeve 133 and the body member 121 serves as a contaminant respository, which area is divided radially by a plurality of ribs 141 integrally formed on the body member 121. The ribs 141 serve to divide and space the contaminant in order to prevent an accumulation of contaminants in one location and thus cause unbalance of the centrifuge. The manner of operation of the centrifuge portion of this device is further described in my aforesaid U.S. Patent No. 3,050,240.

In order to drive the centrifuge assembly, the drive shaft 37 is provided with an integral gear 143 at the right-hand end thereof as viewed in FIG. 2, which is positioned at its base between the collared sleeve bearings 39 and 117. The gear 143 is of the conventional external spur type and is adapted to engage an idler gear 145 mounted on the boss 33 but having a center offset from that of the drive shaft 37. A lock ring 147 serves to retain the idler gear 145 on the boss 33.

The idler gear 145 is provided with integral internal teeth 149 which engage the teeth of the drive shaft gear 143 so as to be driven thereby. The idler gear 145 is further provided with external teeth 151 which drivably engage a gear ring 152 in press-fit relationship with hub 119. It will be seen that the interposition of the idler gear 145 between the drive shaft gear 143 and the hub 119 affords a step-down in rotational speed of the centrifuge assembly 47 as compared with the rotational speed of the drive shaft 37 and impeller 22. By suitable modifications in the size and arrangement of the aforementioned gearing which will be apparent to those skilled in the art, variations may be had in the speed ratio of the impeller to the centrifuge. In the embodiment of the invention illustrated, the ratio of the impeller speed to the centrifuge speed is provided to be 1.5 to 1. Thus if the impeller is rotating at 9,000 r.p.m. the centrifuge will rotate at 6,000 r.p.m.

As a safety portion, a by-pass valve generally indicated at 153 is provided to admit liquid directly from the inlet passage 52 to the outlet passage 55. The by-pass valve 153 would come into operation upon a failure of the driving mechanism where either the impeller or the centrifuge is not rotating and where such absence of rotation would create sufficient reduction in pressure to impair the necessary flow of fuel particularly at elevated altitudes where atmospheric pressure is reduced. It is possible that an inoperative impeller or centrifuge would reduce the pressure sufficiently that a high pressure pump or other mechanism located downstream of the device would become semistarved for fuel or whatever other liquid is being dealt with. Accordingly, the by-pass valve 153 is provided to eliminate the flow of liquid through the impeller housing and axial centrifuge channels where the tortuous paths it would have to follow would be sufficient to produce the undesirable pressure drop. The by-pass valve 153 includes a generally cup-shaped valve element 155 having a tapered terminus 157 adapted to engage a valve seat 159. A cover member 161 is held above the valve seat 159 and in alignment therewith by screws 163 (FIG. 1) and forms a seat against which a coil spring 165 is seated. The spring 165 engages an end wall 167 of the valve element 155 in order to urge the valve element against its seat 159. Additionally, the valve element 155 is provided with a port 169 which admits fluid into the interior of the valve element 155. Thus, the pressure of the fluid existing in the outlet passage 55 and the force of the spring 165 combine to maintain the pressure relief valve 153 closed. Should the impeller 22 cease to function, the fluid flowing through the device will suffer a pressure drop between the inlet passage 52 and the outlet passage 55 and the pressure acting against the valve element 155 from within the inlet passage 52 will move the valve element 155 off its seat 159 when this drop exceeds the pressure exerted by the spring 165.

It has been found expedient, in some cases, to provide means for limiting the amount of pressure boost obtained from the boost pump. For instance, some high pressure pumps in aircraft fuel systems will operate efficiently only if the pressure rises incident to a boast pump mounted upstream therefrom do not exceed a predetermined value. In the operation of a turbo-jet or turbo-prop aircraft engine a wide variation of fuel flow can exist at a given engine speed at varying altitudes. As a result of this condition, a by-pass valve generally indicated at 171 is provided which is responsive to excessive pressures in the liquid outlet passage 55. By-pass valve 171 includes a bore 173 formed in the housing 11 which provides communication from the outlet passage 55 to the inlet passage 52. The bore 173 is provided with a valve seat 175 against which a valve element 177 is adapted to seat. The valve element 177 is carried by a valve stem 179 which is slidably supported in a guide member 181 secured to the housing 11. A coil spring 183 surrounds the guide member 181 and valve 179 and is held in compression between the housing 11 and valve element 177 urging the valve into a position of closure. Through the utilization of spring 183 exerting predetermined forces the valve may be provided to open when the pressure in the outlet passage 55 reaches a predetermined level. Thus the opening of the valve 171 causes fluid to bleed out of the outlet passage 55 and thus reduce the pressure maintained therein.

As previously indicated, the present device is particularly adapted for use in aircraft fuel systems in which case it would be mounted on an aircraft engine and be driven through a suitably splined power shaft engaging the drive shaft adapter 41. Fuel is pumped from the aircraft fuel tank by means of an air frame boost pump and enters the device through the inlet port 53 which is in communication with the inlet passage 52. From the inlet passage 52, the fuel travels through the seals 63 and 59, through the opening and is then pumped by the rotating impeller 22. It will be noted that the impeller 22 is essentially in the shape of a cone and is of the type normally referred to as a mixed flow impeller; that is, producing a combined axial thrust and centrifugal force. The axial thrust is derived from the spiral blades 109 attempting to screw their way into the incoming fuel, which, because the impeller 22 is fixed axially, produces an axial pumping force delivering incoming fuel to the large end of the impeller. The centrifugal force is derived from the difference in diameters between the impeller housing inlet opening 49 and the discharge end of the impeller 22 which is defined by the annular terminus 184 of the impeller housing 50.

The discharge end of the impeller 22 being of a greater diameter than its inlet produces a centrifugal force that can be likened to the action of a typical centrifugal pump. While the fuel does move somewhat radially outwardly due to this difference in diameters, the general direction of its flow may be described as "generally axial." The phrase "generally axial direction" as used herein is intended to mean any direction of flow having a substantial component or vector parallel to the axis of rotation of the device.

It will be noted that as the impeller 22 rotates, the tips 110 of its blades 109 move in extremely close proximity to the surface of the impeller housing 50. Due to the difference in angular velocity between the impeller 22 and impeller housing 50, a boundary layer condition is produced. In the case of conventional pumps operating at a similar 9,000 r.p.m. speed, the relative surface speed between the impeller blade tip and a stationary housing or enclosing wall would be a direct function of the rotational speed of the impeller, namely 9,000 r.p.m. However, in the device of the present invention, the impeller housing 50 is itself rotating at a substantial rate of speed which is nominally 6,000 r.p.m. Therefore, the relative speed between these members is only 3,000 r.p.m. as opposed to 9,000 r.p.m. in a conventional pump having a stationary enclosure. By thus reducing the relative rotational speed, the magnitude of the consequent boundary layer condition with its consequent problems of turbulence, frothing and vaporization is similarly diminished.

In aircraft usage, the problem of fuel vapor and air existing in the fuel is one of extreme importance in the proper delivery of the fuel to the high pressure pump and fuel injection system. It will be appreciated that aircraft fuel is of a highly volatile nature and that in aircraft flying at high altitudes and in cases where the fuel becomes heated, this problem is intensified. It has been found that at the inlet of a boost pump impeller there exists a partial vacuum around the impeller's base. This vacuum may be likened to the vortex of water draining out of a drain hole in a bathtub or basin. It has been found by test and actual observation that this condition is the result of imparting a high angular velocity to the fuel as it initially enters the impeller, and the magnitude of this vacuumizing zone is proportional to the degree of initial angular velocity imparted to the fuel. It is at this point of vacuumizing that vapor and air bubbles form or collect.

It is known that a certain amount of air always exists in aircraft fuel and various liquids may be rated according to their ability to absorb air. As the fuel moves and splashes about in the aircraft fuel tank, it entraps air and adds to whatever air might already be absorbed therein. When a large vacuum is created within the fuel the air particles are drawn to this location as it is the point of least resistance. Therefore, the vacuum zone tends to concentrate into bubble form whatever air and other vapor might exist in the fuel and furthermore tends to vaporize additional fuel. The formation of bubbles in the impeller can become such that when passed along in the fuel stream to the entry of the high pressure pump, the suction and filling ability of the air pressure pump is impaired to the extent that it becomes fuel starved and moves into a condition normally referred to as "cavitation."

In order to maintain the bubble forming tendency of the impeller at a low level and within the limits than can be handled by the high pressure pump, it has been found extremely desirable to maintain a low angle of incidence on the impeller blade as it initially screws onto the incoming fuel so as to impart a minor circumferential vector to the fuel. Thus, it has been found desirable to limit the angle of attack to less than 4° at the impeller inlet. This means the incoming fuel is given a more gradual acceleration in angular velocity rather than a sudden and abrupt acceleration which produces the local vacuumizing and the undesired bubbles. This desired low angle of incidence at the inlet is incorporated in the impeller 22 in the device of the present invention. It will be seen that the housing 50 extends between the outer diameter of the inlet opening 49 and the inner diameter of the centrifuge channel at the inlet end thereof. Thus, the housing 50 and impeller 20 serves to direct liquid in an axially and radially outwardly extending annular path to provide a smooth transition between the impeller inlet opening 49 and the annular centrifuge channel between the impeller housing 50 and the body member 121. Upon its discharge from the impeller 22, liquid flows directly into said annular centrifuge channel in an open annular path where it is caught up by the rotating vanes 139. Thus, the arrangement of parts produces a minimum obstruction to liquid flow and the liquid entering the centrifuge portion of the device is already under a certain amount of centrifugal force. The particular impeller housing 50 and screw blade 109 possess a substantial cone angle, which is well in excess of 5°, as will be apparent from an inspection of the drawings.

As the fuel is moved along the impeller 22, it is forced under the combined action of axial thrust and centrifugal force through the discharge end 184 of the impeller 22 radially outwardly of the annular, axially extending centrifuge channel bounded by the impeller housing 50 at its inside diameter and the body member 121 at its outside diameter. The fluid then reverses its direction of travel and flows in the opposite axial direction toward the outlet ports 51. When the device is initially started, fuel will flow outwardly of the louvered sleeve 133 and fill the unoccupied space in the contaminant repository formed between the sleeve 133 and body member 121. However, once the contaminant repository is filled, the fuel will normally flow in an axial direction inwardly of the louvered sleeve 133 with the contaminating particles contained in the fuel being thrown radially outwardly through the louvered sleeve 133 and retained in the radially outer margin of the annular channel, which serves as the contaminant repository.

As the fuel moves along the centrifuge channel, it is picked up by the vanes 139 which impart to it a high angular velocity. Due to the high rotational speed of the centrifuge assembly 47 and the distance of the fuel from the axis of rotation, a high number of units of gravitational force are imparted to the contaminant particles within the fuel, which throw them radially outwardly through the fuel into the contaminant repository. The effectiveness of the centrifuge to extract the contaminating particles from the fuel is dependent upon the time over which the gravitational force operates upon the contaminant particles. As the fluid enters the centrifuge, the heavier particles are normally thrown out immediately. However, the lighter particles require a greater time within which to move through the fuel, and in order to afford this greater period of time, the axial velocity of the fuel moving along the centrifuge channel constantly diminishes as it approaches the outlet ports 51. This is due to the increased cross-sectional area of the channel as it diverges inwardly toward the smaller end of the impeller 22. Thus, the frusto-conical shape of the impeller housing 50, which is closely spaced around the impeller blade tips 110, is utilized to produce a gradual reduction in axial velocity of the fuel flowing through the centrifuge assembly 47. This increase in diameter is achieved without the necessity of increasing the over-all size and weight of the device.

In addition to its contaminant extracting function, the centrifuge assembly 47 combines with the pump impeller 22 in performing a pumping function. It will be noted that a difference in diameter exists between the inlet 49 of the impeller 22 and the outlet 51 of the centrifuge. This difference in diameter is such as to produce a difference in centrifugal force and the centrifuge functions in a manner similar to a centrifugal pump. It has been found that the pressure rise due to the centrifuge alone represents approximately 60% of the pressure demanded of the device as a whole in order to adequately supply a high pressure aircraft fuel pump under adverse operating conditions. Thus, only 40% of the total pressure rise is required of the impeller 22, and therefore both the axial and centrifugal values produced by the impeller 22 may be reduced by 60% from that of conventional boost pumps heretofore necessary. As a result of this fact, the angle of incidence of the impeller blades 109 may be lowered to the desired amount without increasing the over-all size and weight of the device. Thus an impeller may be utilized having a low angle of attack at its inlet and which will have greatly reduced bubble-forming tendencies as compared to impellers of the same size and weight heretofore necessary to accomplish the required pressure boost.

When the fuel reaches the end of its axial travel along the centrifuge channel, it emerges from the centrifuge assembly 47 through the plurality of annularly arranged outlet ports 51 which communicate with the outlet passage 55 facing the ports 51. While the outlet ports 51 are in closely spaced proximity to the outlet passage 55, a clearance exists between the end wall 125 of the centrifuge assembly 47 and the housing 11 as indicated at 185, thereby creating a path for fluid leakage. However, the housing cover 21, which is in sealing engagement with the housing 11, forms a sealed enclosure for the centrifuge assembly 47 which will contain the liquid under pressure. Thus, when the space between the centrifuge assembly 47 and the cover 21 becomes filled with liquid, the pressure existing therein will closely approximate the pressure of the liquid emerging from the outlet ports 51 and resist further leakage.

Should there be a drive failure and the centrifuge and boost pump cease to rotate, the normal pressure rise would, of course, fail to develop. Instead, a pressure drop would occur due to the restrictions and tortuous passages of the impeller. Thus, the pressure existing within the inlet passage 52 would exceed that in the outlet passage 55. When this pressure differential exceeds the force exerted by the spring 165 of the by-pass valve 153, the by-pass valve will open in order to admit liquid directly from the inlet passage 52 and thus it is assured that no more than a minimal drop in pressure can occur in the device of the present invention as a result of mechanical failure. On the other hand, should the device produce a pressure greater than that desired, the pressure relief valve 171 is operable to admit liquid from the outlet passage 55 to the inlet passage 52 in order to reduce this pressure. The pressure existing in the outlet passage 55 acts against the face of the valve 177, while pressure existing in the inlet passage 52 opposes this force. The spring 183 of the pressure-relief valve is of a predetermined strength to open when the pressure differential exceeds a given value. Thus by the use of a pressure-relief valve spring of a given value, the maximum pressure boost produced by the impeller and centrifuge may be limited.

In order to disassemble the device for maintenance and cleaning, the screws 23 are first loosened in order to remove the housing cover 21 and expose the centrifuge assembly 47. The screws 129 of the centrifuge assembly 47 are then loosened, each a small amount at a time. Upon such loosening, the lock rings 131 which are fixed in position on the screws 129, abut the shoulder 134 of the centrifuge body member 121. The close fitting engagement of the body member 121 with the end wall 125 is thereby broken and a separation of the several components of the centrifuge assembly 47 is facilitated. The louvered sleeve 133 separates from the end wall 125, thereby exposing the contaminant storage areas between the ribs 141. The accumulated contaminant particles may be washed away by dipping the body member 121 in cleaning fluid of light viscosity, and the device may then be reassembled by the reverse of the above procedure.

Should it become necessary to totally disengage the centrifuge assembly 47 from the housing 11, the seal member 59 will break its frictional engagement with the tapered opening 49 due to the abutment of its annular shoulder 72 against the flange 71. Thus, while the flange 71 secures the seal 59 against further axial displacement, the spring 68 operates to maintain the sealing engagement between seals 63 and 59 and assure that no dirt or other contaminating matter will come in contact with their flat mating faces. Should any dirt be accumulated on the mating surfaces of these seals it could scratch or otherwise deface the surface upon the relative movement of the seals when the device is again operated. Such scratches or deformations in the flat face would, of course, impair the sealing ability of the seals and result in leakage. The construction of the seals of the present invention is designed to insure that the seals are protected from such hazards.

While the device of the present invention has been described as being adapted for mounting on an aircraft engine so as to be directly driven by the engine, it will be appreciated that other methods of mounting or driving the device may be utilized. For example, the device may be used in an aircraft fuel tank and be driven by an electric motor. Further, the device may be mounted on the high pressure fuel pump itself, and be driven therefrom through suitable gearing to obtain the necessary high rotation speed.

This application is a continuation of my earlier application Serial No. 724,716, filed March 28, 1958, now abandoned.

It will be appreciated that the invention is susceptible of other modification variation and change without departing from the proper scope or fair meaning of the subjoined claims.

What is claimed is:

1. In a device of the character described, an elongated pump impeller having a conical screw blade and a rotatable centrifuge assembly having a frusto-conically shaped inner wall closely surrounding said impeller so as to form a housing therefor, said centrifuge assembly having an annular louvered retention member spaced outwardly around said impeller housing wall so as to form a channel therebetween of annular cross section and of increasingly greater area adjacent the smaller end of said impeller, said annular channel being in communication with the larger end of said impeller from which liquid is discharged, said centrifuge having outlet means located so that liquid flows axially along said annular channel past said louvered retention member at a constantly decreasing velocity as the cross sectional area of said channel increases.

2. In a device of the character described, a drive shaft, a pump impeller drivably mounted on said drive shaft, a centrifuge assembly mounted on said drive shaft independently of said impeller and having a hub portion journalled on said drive shaft adjacent one end of said impeller, an annular inner wall surrounding said impeller so as to form a housing therefor, a body member spaced radially outwardly around said inner wall so as to form an annular channel therebetween in communication with the discharge end of said impeller, and contaminant storage means disposed at the radially outer margin of said annular channel, a gear carried by said drive shaft adjacent said hub, a gear carried by said hub adapted to be driven by said drive shaft gear to rotate said centrifuge at a different speed than said drive shaft.

3. In a liquid delivery device, an elongated pump impeller having a conical screw blade and a rotatable centrifuge assembly having a frusto-conically shaped inner wall closely surrounding said impeller so as to form a housing therefor, said centrifuge assembly having an annular outer wall spaced outwardly around said impeller housing wall so as to form a channel therebetween of annular cross section and of increasingly greater area adjacent the smaller end of said impeller, said annular channel being in communication with the larger end of said impeller from which liquid is discharged, and contaminant storage means disposed at the radially outer margin of said annular channel, said centrifuge having outlet means located so that liquid flows axially along said annular channel past said contaminant storage means at a constantly decreasing velocity as the cross sectional area of said channel increases.

4. A liquid delivery device including a housing having an inlet and an outlet, a rotary centrifuge body in said housing having an axial passage of annular cross section for the flow of fluid axially therealong to said outlet and radial vanes in said passage for imparting rotation to the fluid therein, a rotary impeller arranged to receive fluid from said inlet disposed coaxially with respect to said centrifuge body and having a conical screw blade for pumping fluid in an axially and radially outward direction, means defining a conical enclosure for said impeller closely surrounding the tip of said screw blade and operable to direct the fluid pumped by said impeller in an open, annular, outwardly diverging path leading directly to one end of said annular passage, means in said housing providing a pressure relief opening for the direct flow of fluid from said outlet to said inlet, a valve for closing said opening and exposed to outlet and inlet fluid pressure on opposite sides thereof, and a spring normally maintaining said valve closed and biasing said valve in a direction acting against outlet fluid pressure whereby said valve will open when the force of outlet fluid pressure acting against said valve is greater than the sum of the forces on said valve produced by inlet fluid pressure and said spring.

5. A liquid delivery device including a housing having an inlet and an outlet, a rotary centrifuge body in said housing having an axial passage of annular cross section for the flow of fluid axially therealong to said outlet and radial vanes in said passage for imparting rotation to the fluid therein, a rotary impeller arranged to receive fluid from said inlet disposed coaxially with respect to said centrifuge body and having a conical screw blade for pumping fluid in an axially and radially outward direction, means defining a conical enclosure for said impeller closely surrounding the tip if said screw blade and operable to direct the fluid pumped by said impeller in an open, annular, outwardly diverging path leading directly to one end of said annular passage, means in said housing providing a bypass opening for the direct flow of fluid from said inlet to said outlet, a valve for closing said opening exposed to inlet and outlet fluid pressure on opposite sides thereof, and a spring normally maintaining said valve closed and biasing said valve in a direction acting against inlet fluid pressure whereby said valve will open when the force of inlet fluid pressure acting against said valve is greater than the sum of the forces on said valve produced by outlet fluid pressure and said spring.

6. A liquid delivery device including a housing having an inlet and an outlet, a rotary centrifuge body in said housing having an axial passage of annular cross section for the flow of fluid axially therealong to said outlet and radial vanes in said passage for imparting rotation to the fluid therein, a rotary impeller arranged to receive fluid from said inlet disposed coaxially with respect to said centrifuge body and having a conical screw blade for pumping fluid in an axially and radially outward direction, means defining a conical enclosure for said impeller closely surrounding the tip of said screw blade and operable to direct the fluid pumped by said impeller in an open, annular, outwardly diverging path leading directly to one end of said annular passage, means in said housing providing a pair of by-pass openings for the direct flow of fluid between said inlet and said outlet, a pair of valves for closing said openings, and a pair of springs, one of said springs being operable to close one of said valves and bias said one valve in a direction acting against inlet fluid pressure and the other of said springs being operable to close the other of said valves and bias said other valve in a direction acting against outlet fluid pressure.

7. A liquid delivery device operable to purify and pressurize highly volatile liquids in a reduced atmospheric environment, said device including a centrifuge having an axially extending passage of annular cross section provided with an inlet and an outlet at opposite ends thereof, radially extending vanes in said passage for imparting rotation to liquid therein, a mixed flow impeller arranged to receive liquid at one end thereof and to deliver liquid under increased pressure at its opposite end to said passage inlet, said impeller having a radially expanding base portion and a radially expanding screw blade, a conical enclosure for said impeller disposed closely adjacent the periphery of said blade, the large diameter end of said enclosure being arranged adjacent the inlet of said passage and being directly open to said passage inlet, the radial growth of said blade being equal at least one-half the difference in diameter between the small diameter end of said enclosure and the inner diameter of said passage at its said inlet, whereby liquid entering the small diameter end of said enclosure will be pressurized and driven in rotation in an axially and radially outwardly extending path by said impeller into the inlet of said passage.

8. A liquid delivery device operable to purify and pressurize highly volatile liquids in a reduced atmospheric environment, said device including a centrifuge having an axially extending passage of annular cross section provided with an inlet and an outlet at opposite sides thereof, radially extending vanes in said passage for imparting rotation to liquid therein, a mixed flow impeller arranged to receive liquid at one end thereof and to deliver liquid under increased pressure at its opposite end to said passage inlet, said impeller having a radially expanding base portion and a radially expanding screw blade, a conical enclosure for said impeller disposed closely adjacent the periphery of said blade, the large diameter end of said enclosure being arranged adjacent the inlet of said passage and being directly open to said passage inlet, said screw blade and said enclosure having a cone angle which is at least 5° to the axis of rotation of said impeller and which is sufficient to effect a substantial increase in the pressurization of the liquid and prevent the separation and concentration of vapor container in the liquid.

9. A liquid delivery device operable to purify and pressurize highly volatile liquids in a reduced atmospheric environment, said device including a centrifuge having an axially extending passage of annular cross-section provided with an inlet and an outlet at opposite ends thereof, radially extending vanes in said passage for imparting rotation to liquid therein, a mixed flow impeller arranged to receive liquid at one end thereof and to deliver liquid under increased pressure at its opposite end to said passage inlet, said impeller having a radially expanding base portion and a radially expanding screw blade, a conical enclosure for said impeller disposed closely adjacent the periphery of said blade, said screw blade and said enclosure having a cone angle which is at least 5° and which is sufficient to substantially increase the pressurization of the liquid and prevent separation and concentration of vapor contained in the liquid, the large diameter end of said enclosure being arranged adjacent the inlet of said passage and being directly open to said passage inlet, said passage being of greater radial thickness adjacent the outlet end thereof than it is adjacent the inlet end thereof.

(References on following page)

References Cited by the Examiner

UNITED STATES PATENTS

| | | | |
|---|---|---|---|
| 496,120 | 4/93 | Hart | 233—44 |
| 521,104 | 6/94 | Davis | 233—28 X |
| 994,497 | 6/11 | Berrigan | 233—4 |
| 1,055,254 | 3/13 | Berrigan | 233—4 |
| 1,061,656 | 5/13 | Black | 233—19 |
| 1,277,676 | 9/18 | Wright | 233—45 |
| 1,534,191 | 4/25 | Stryker | 233—21 |
| 1,619,652 | 3/27 | Carter | 233—2 |
| 2,003,621 | 6/35 | Andersson | 233—45 X |
| 2,373,349 | 4/45 | Serrell | 233—21 X |
| 2,433,864 | 1/48 | Pattee | 233—7 |
| 2,450,737 | 10/48 | Rundquist | 233—45 X |
| 2,663,424 | 12/53 | Bynum | 210—377 |
| 3,050,240 | 8/62 | Darnell | 233—31 |
| 3,072,323 | 1/63 | Stoermer | 233—33 |

FOREIGN PATENTS

| | | |
|---|---|---|
| 13,464 | 4/99 | Great Britain. |
| 278,161 | 10/27 | Great Britain. |
| 496,031 | 6/54 | Italy. |
| 157,520 | 1/57 | Sweden. |

GEORGE D. MITCHELL, *Primary Examiner.*

ROBERT F. BURNETT, HERBERT F, MARTIN,
*Examiners.*

UNITED STATES PATENT OFFICE
CERTIFICATE OF CORRECTION

Patent No. 3,178,105                        April 13, 1965

Rex C. Darnell

It is hereby certified that error appears in the above numbered patent requiring correction and that the said Letters Patent should read as corrected below.

Column 1, line 41, after "fuel", first occurrence, insert -- system --; column 12, line 35, for "sides" read -- ends --; line 50, for "container" read -- contained --.

Signed and sealed this 21st day of September 1965.

(SEAL)
Attest:

ERNEST W. SWIDER
Attesting Officer

EDWARD J. BRENNER
Commissioner of Patents